(12) United States Patent
Huang et al.

(10) Patent No.: US 10,333,403 B2
(45) Date of Patent: Jun. 25, 2019

(54) ADAPTIVE ON-TIME SWITCHING CONVERTER

(71) Applicant: Powerventure Semiconductor Limited, London (GB)

(72) Inventors: Chi-Chia Huang, Hsinchu (TW); Yuan-Wen Hsiao, Hsinchu (TW)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/361,981

(22) Filed: Nov. 28, 2016

(65) Prior Publication Data

US 2017/0373596 A1 Dec. 28, 2017

Related U.S. Application Data

(63) Continuation-in-part of application No. 15/195,991, filed on Jun. 28, 2016.

(51) Int. Cl.
*H02M 3/158* (2006.01)
*H02M 1/00* (2006.01)
*H02M 3/156* (2006.01)

(52) U.S. Cl.
CPC ............ *H02M 3/158* (2013.01); *H02M 3/156* (2013.01); *H02M 3/1582* (2013.01); *H02M 3/1584* (2013.01); *H02M 3/1588* (2013.01); *H02M 2001/0025* (2013.01); *H02M 2001/0032* (2013.01); *Y02B 70/16* (2013.01)

(58) Field of Classification Search
CPC ................. H02M 3/156; H02M 3/158; H02M 2001/0025
USPC ......................................................... 323/288
See application file for complete search history.

(56) References Cited

U.S. PATENT DOCUMENTS

| 8,080,987 | B1* | 12/2011 | Qiu | H02M 3/156 323/284 |
| 8,395,367 | B2* | 3/2013 | Chien | H02M 3/1588 323/288 |
| 2012/0229707 | A1* | 9/2012 | Murakami | H02M 3/156 348/730 |
| 2013/0033243 | A1* | 2/2013 | Takemae | H02M 1/38 323/271 |

(Continued)

OTHER PUBLICATIONS

"Adaptive Constant On-Time (D-CAP TM) Control Study in Notebook Applications," Texas Instruments Application Report, SLVA281B, Jul. 2007, by Chuan Ni et al., pp. 1-9.

(Continued)

*Primary Examiner* — Fred E Finch, III
*Assistant Examiner* — Rafael O. De León Domenech
(74) *Attorney, Agent, or Firm* — Saile Ackerman LLC; Stephen B. Ackerman

(57) ABSTRACT

Adaptive-on-time techniques to improve the frequency variations inherent in constant-on-time COT converters are presented. A switching converter contains a power switch; a pulse generator adapted to generate a pulsed signal to switch the power switch on with a switching frequency; a ramp generator adapted to generate a ramp signal; and a controller adapted to detect a parameter of the ramp signal, compare the parameter with a reference value, and to generate a control signal based on the comparison to control the switching frequency. This allows controlling a switching frequency of the converter without increasing a noise level of the converter.

19 Claims, 11 Drawing Sheets

(56) References Cited

U.S. PATENT DOCUMENTS

| | | | | |
|---|---|---|---|---|
| 2013/0314060 A1* | 11/2013 | Chen | ................. | G05F 1/46 323/234 |
| 2014/0084891 A1* | 3/2014 | Chien | ................. | H02M 3/1588 323/284 |
| 2015/0362937 A1* | 12/2015 | Wang | ................. | H02M 3/156 323/281 |
| 2017/0033689 A1* | 2/2017 | Chen | ................. | H02M 3/1582 |
| 2017/0077812 A1* | 3/2017 | Guo | ................. | H02M 3/158 |

OTHER PUBLICATIONS

"ACOT TM (Advanced Constant-On Time) Synchronous Step-Down Converters," Richtek Selection Guide SG002, Richtek Technology Corporation, Oct. 2015, pp. 1-6.

Adaptive On-Time DC-DC Converters Combine Speed and Efficiency, Power Electronics Technology, Editor in Chief: Sam Davis, PETinnovations, Copyright 2010 by Penton Media, Inc., 4 pgs.

MIC2166, "Adaptive On-Time DC-DC Controller, Hyper Speed Control TM Family," MICREL, Incorporated, Sep. 2010, pp. 1-28.

"A buck converter with adaptive on-time PFM control and adjustable output voltage," by Hyunseok Nam et al., J. Analog Integr Circ Sig Process (2012) 71:327-332, Mixed Signal Letter, May 2012, DOI:10.1007/s10470-011-9802-7.

"A Current Mode Adaptive On-Time Control Scheme for Fast Transient DC-DC Converters," by Hung-Chih Lin et al., IEEE International Symposium on Circuits and Systems, 2008. ISCAS 2008. May 18-21, 2008, pp. 2602-2605.

"A Fast Fixed-Frequency Adaptive-On-Time Boost Converter With Light Load Efficiency Enhancement and Predictable Noise Spectrum," by Xiaocheng Jing et al., IEEE Journal of Solid-State Circuits, vol. 48, No. 10, Oct. 2013, pp. 2442-2456.

"Frequency compensation circuit for adaptive on-time control buck regulator," by Ling Feng Shi et al., Published in IET Power Electronics, Jul. 2014, vol. 7, Iss. 7, pp. 1805-1809.

* cited by examiner

ADAPTIVE ON-TIME SWITCHING CONVERTER

This application is a Continuation-in-Part of U.S. application Ser. No. 15/195,991, filed on Jun. 28, 2016, which is hereby incorporated by reference in its entirety.

TECHNICAL FIELD

The present disclosure relates to an apparatus and methods for regulating an output of a switching converter. In particular, the present invention relates to regulating a switching frequency of an adaptive on-time switching converter.

BACKGROUND

Constant-on-time, COT, switching converters present a number of advantages over other types of switching converters. In particular such converters offer a fast transient response, a high efficiency under light load and a smooth transition from continuous conduction-mode CCM to discontinuous conduction-mode DCM of operation.

However, when changing between a high load condition and a low load condition, the switching frequency of the COT converter varies. This is because the on and off switching cycle of a COT converter is controlled based on the load demand instead of an internal pre-determined clock. In addition, COT converters tend to suffer from large output voltage variations.

SUMMARY

In order to address the frequency variation issue inherent to COT converters, a number of so called adaptive-on-time AOT techniques have been proposed.

For example, the on-time of the COT converter may be adjusted using an adaptive current generated based on a difference between the supply voltage and the output voltage of the converter.

Alternatively, the frequency of the COT converter at the switching node may be locked using a reference frequency.

Such techniques rely on signals from one or more of the supply voltage pins, the output voltage pin and the switching SW pin of the converter and are as a consequence noise sensitive. Depending on the approach the AOT technique may also reduce the efficiency of the COT converter.

It is an object of the invention to address one or more of the above mentioned limitations.

According to a first aspect of the disclosure there is provided a switching converter for providing an output voltage comprising a power switch; a pulse generator adapted to generate a pulsed signal to switch the power switch on with a switching frequency; a ramp generator adapted to generate a ramp signal; and a controller adapted to detect a parameter of the ramp signal, compare the parameter with a reference value, and to generate a control signal based on the comparison to control the switching frequency.

This allows controlling a switching frequency of the converter without increasing a noise level of the converter.

Optionally, the pulsed signal comprises an on-time and the control signal is adapted to change the on-time of the pulsed signal.

Optionally, the parameter of the ramp signal comprises at least one of an amplitude of the ramp signal and an on-width of the ramp signal.

Optionally, the control signal may be adapted to increase the on-time of the pulsed signal when at least one of the amplitude and the on-width of the ramp signal is less than a reference value.

Optionally, the control signal may be adapted to decrease the on-time of the pulsed signal when at least one of the amplitude and the on-width of the ramp signal is more than a reference value.

Optionally, the parameter of the ramp signal comprises a frequency of the ramp signal.

Optionally, the controller comprises a comparator adapted to compare the parameter of the ramp signal with a reference value and to output a signal based on the comparison.

Optionally, the comparator comprises at least one of an operational amplifier and a digital subtractor coupled to a digital to analog converter.

Optionally, the controller comprises a first circuit adapted to detect a time duration during which the ramp signal is turned on.

Optionally, the first circuit comprises a current generator coupled to a capacitor and a switch connected in parallel with the capacitor; wherein the switch is adapted to receive a reset signal.

Optionally, the first circuit comprises a counter.

Optionally, the switching converter comprises another controller coupled to the ramp generator, the another controller being adapted to detect a parameter of the ramp signal, compare the parameter with a reference value, and to generate another control signal based on the comparison, wherein the ramp generator is adapted to receive the another control signal and to alter at least one of a delay and a slope of the ramp signal based on the another control signal.

Optionally, the ramp generator comprises a capacitor circuit and a delay circuit coupled to a comparator; wherein the comparator is adapted to compare an output of the delay circuit with a reference value; and wherein the capacitor circuit is adapted to receive an output of the comparator.

According to a second aspect of the disclosure there is provided a method of controlling a switching frequency of a switching converter comprising a power switch, the method comprising generating a pulsed signal to switch the power switch on with a switching frequency; generating a ramp signal to regulate an output voltage of the switching converter; detecting a parameter of the ramp signal; comparing the parameter with a reference value; and generating a control signal based on the comparison, to control the switching frequency.

Optionally, the pulsed signal comprises an on-time and the control signal is adapted to change the on-time of the pulsed signal.

Optionally, the parameter of the ramp signal is at least one of an amplitude of the ramp signal and an on-width of the ramp signal.

Optionally, the method comprises increasing the on-time of the pulsed signal upon identifying that at least one of the amplitude and the on-width of the ramp signal is less than a reference value.

Optionally, the method comprises decreasing the on-time of the pulsed signal upon identifying that at least one of the amplitude and the on-width of the ramp signal is more than a reference value.

Optionally, the parameter of the ramp signal is a frequency of the ramp signal.

Optionally, the method comprises generating another control signal to control at least one of a delay and a slope of the ramp signal.

Optionally, generating the another control signal comprises detecting another parameter of the ramp signal, comparing the another parameter with another reference value, and generating the another control signal based on the comparison.

BRIEF DESCRIPTION OF THE DRAWINGS

The invention is described in further detail below by way of example and with reference to the accompanying drawings, in which.

DESCRIPTION

Figure 1:
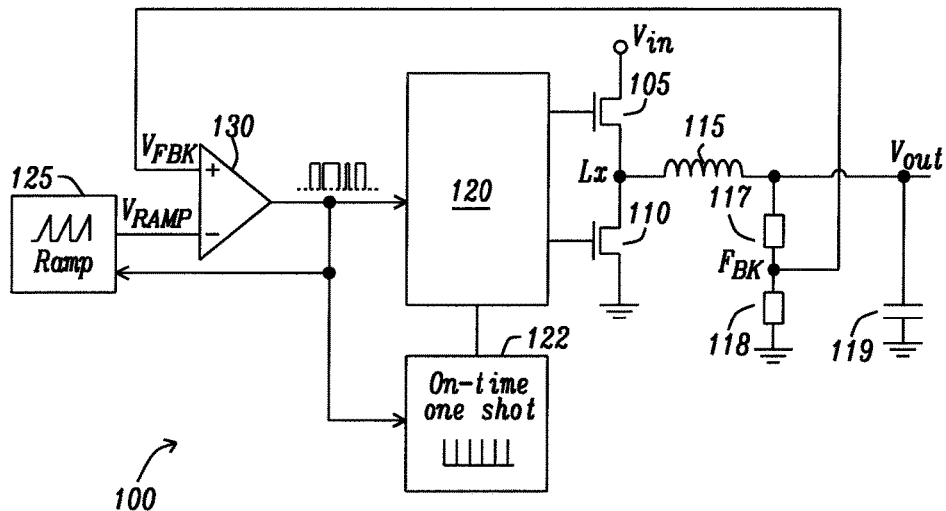
FIG. 1 is a diagram of a constant on-time switching converter.

FIG. 1 illustrates a constant on-time switching converter 100. The converter includes a high side power switch 105 and a low side power switch 110 connected at a switching node Lx. An inductor 115 has a first terminal coupled to the Lx node and a second terminal coupled to a potential divider formed by a first resistor 117 connected in series with a second resistor 118 at a feedback node, Fbk. An output capacitor 119 is coupled in parallel with the potential divider.

A gate driver 120 has a first input coupled to a pulse generator 122, a second input coupled to a Pulse Width Modulation PWM comparator 130 and two outputs coupled to the high side power switch 105 and the low side power switch 110 respectively.

The Pulse Width Modulation PWM comparator 130 has a first (for example non-inverting) input for receiving an output voltage Vfbk of the converter, a second (for example inverting) input for receiving a ramp Voltage Vramp from a ramp generator 125, and one output coupled to an input of the gate driver 120. The output of the PWM comparator 130 is also coupled to an input of the pulse generator 122 and to an input of the ramp generator 125 respectively. The ramp generator 125 and the Pulse Width Modulation PWM comparator 130 form a regulation loop for regulating an output voltage of the converter.

Figure 2:
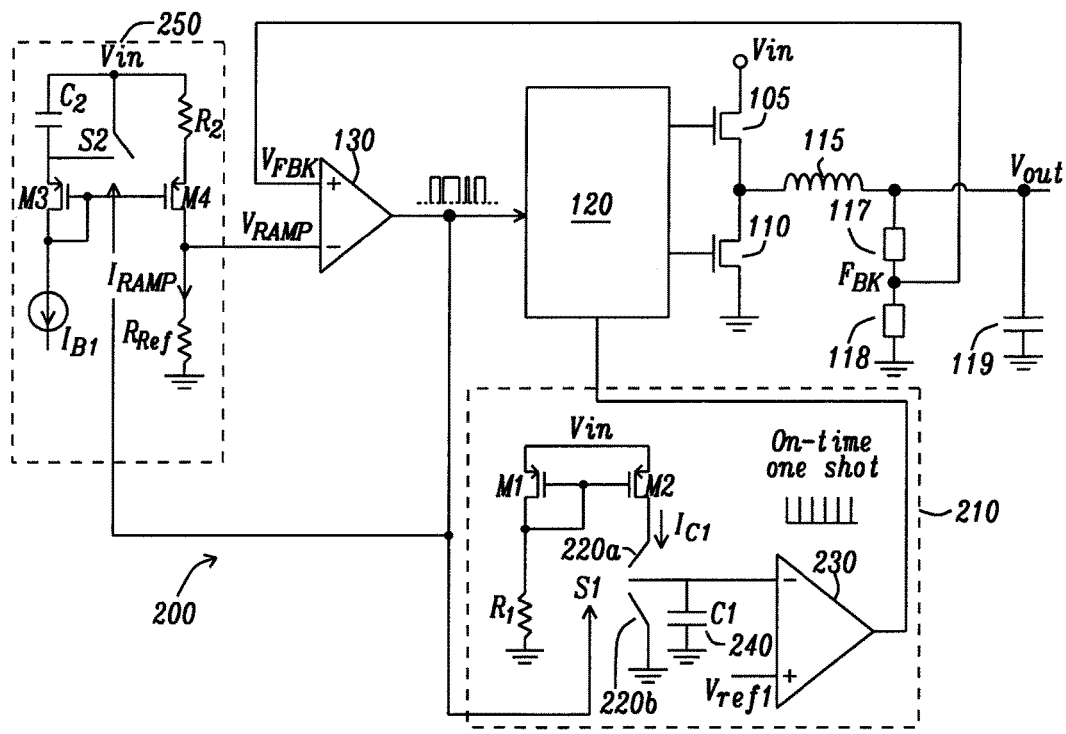
FIG. 2 is another diagram of a constant on-time switching converter.

FIG. 2 shows a circuit diagram of a constant on-time switching converter provided with an exemplary pulse generator 210 and an exemplary ramp generator 250. The on-time generator 210, also referred to as on-time generator has a current mirror formed by two transistors M1 and M2. A source of transistor M1 is connected to a source of transistor M2. A drain of transistor M1 is connected to a resistor R1. A drain of transistor M2 is connected to a double switch S1 formed by a pair of switches 220a and 220b. The switch S1 is connected to the output of the PWM comparator 130. A comparator 230 has a first, for example inverting input connected to the switch S1 and a second, for example non-inverting input, connected to a reference voltage Vref1. A capacitor C1 240 has a first terminal connected to the first input and a second terminal connected to a ground.

The ramp generator 250 has a current mirror formed by a first transistor M3 coupled to a second transistor M4. A gate of the first transistor M3 is connected to a gate of the second transistor M4. A source of transistor M3 is coupled to a capacitor C2 and a source of transistor M4 is coupled to a resistor R2. A switch S2 is coupled in parallel with the capacitor C2. A drain of transistor M3 is coupled to a current generator. A drain of transistor M4 is coupled to a reference resistor Rref. An input voltage Vin is provided at an input node connected to C2, R2 and S2.

The PWM comparator 130 may be adapted to compare Vfbk with a signal mixture. The signal mixture may comprise the ramp signal and another signal. For example, the other signal may include the voltage at the switching node, the inductor current, the output voltage of the converter or a filtered version of any one of these quantities. The signal mixture may be used to improve the transient response of the switching converter.

Figure 3:
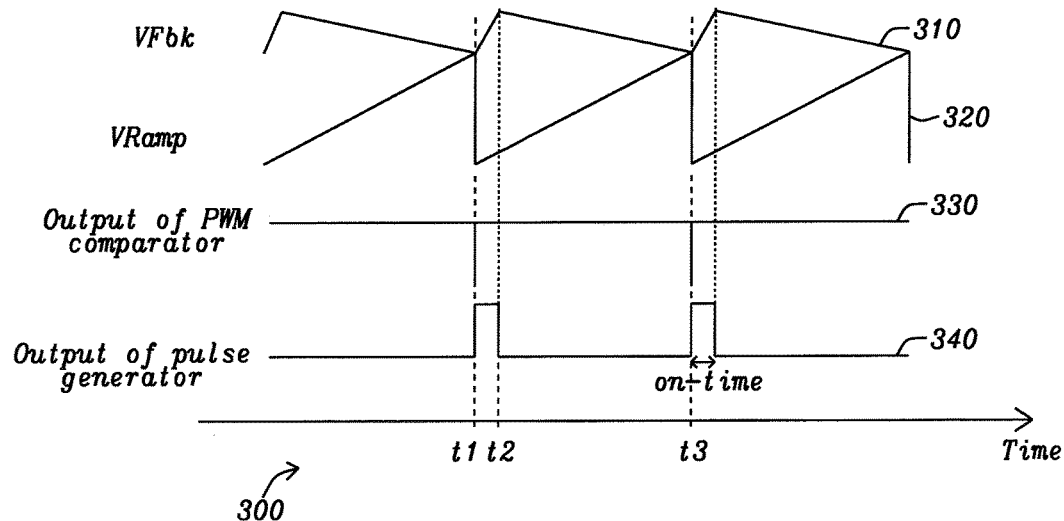
FIG. 3 is a timing chart illustrating the working of the switching converter of FIG. 2.

FIG. 3 shows the waveforms of the feedback voltage 310, the ramp voltage 320, the output signal of the PWM comparator 330 and the output signal 340 of the pulse generator of the switching converter of FIG. 2. In FIG. 1, when Vfbk 310 is lower than Vramp, the comparator 130 triggers the on time generator 122 to generate a one-shot pulse that determines the turn-on duration of the high side switch.

At time t=t1, the feedback voltage 310 is equal to or less than the ramp voltage 320. The comparator 130 outputs a low logic signal 330, for example a logic 0 which is received at the ramp generator 250, the driver 120 and the pulse generator 210.

When the low logic signal 330 is received at the ramp generator 250, the switch S2 turns on (closed) and the capacitor C2 discharges to reset the ramp signal. Then, shortly after, the PWM comparator 130 outputs a logic high signal, for example a logic 1, which opens the switch S2. A constant current $I_{B1}$ generated by a current generator charges C2 such that the voltage across C2 ramps up between times t1 and t3. In this way the output signal from the PWM comparator 130 sets the frequency of the ramp. The voltage across C2 is mirrored onto resistor R2, which in turn generates a current $I_{Ramp}$ that ramps up with time. The ramp-up current $I_{Ramp}$, together with the reference resistor Ref define a ramp voltage $V_{Ramp}=R_{Ref} \times I_{Ramp}$.

When the low logic signal 330 is received at the driver 120 at time t1, the high switch 105 turns on and the low switch 110 turns off. Then shortly after the PWM comparator 130 outputs a high logic high signal, for example a logic 1, and release the control of the power switch to the pulse generator 210.

When the low logic signal 330 is received at the pulse generator 210 at time t1, the switch 220a of S1 opens and the switch 220b closes to discharge the capacitor C1. Then shortly after the high logic signal 330 closes the switch 220a and opens the switch 220b, such that the current IC1 can start charging the capacitor C1, 240. The comparator 230 of the pulse generator outputs a high logic signal 340, for example a logic 1.

Between times t1 and t2, a current $I_{C1}$ charges the capacitor C1 from an initial voltage for example 0V to a reference voltage Vref1. The current $I_{C1}$ is approximately inversely proportional to a supply voltage Vin provided at a source of the current mirror formed by M1 and M2. The comparator 230 compares a voltage VC1 across C1, with the reference voltage Vref1 and outputs a logic high signal as long as VC1<Vref. The charging time of C1 determines the on-time of the high-side switch 105. Between t1 and t2, the high side switch 105 is on and the feedback voltage 310 increases.

At time t=t2, the capacitor C1 has reached Vref1, the comparator 230 outputs a logic low as long as VC1≥Vref. The high side switch 105 turns off and VFbk stops increasing.

Between t=t2 and t3 the feedback voltage 310 decreases to a value equal to or less than Vramp. During this period, the output of the comparator 330 is high. The switch 220a is closed while the switch 220b is open such that the voltage VC1 across C1 keeps increasing.

Therefore, in operation, the pulse generator outputs a train of pulses in which each pulse has a fixed on-time. When Vfbk 310 is lower than Vramp 320, the comparator 130 sends a logic low 330 to the gate driver 120. The gate driver 120 then turns on the high side switch 105 for a fixed duration D*T, where D is the duty cycle and T is the switching period, hence the name "constant on-time switching converter". When that fixed duration expires, the gate driver 120 turns off the switch 105 and turns on the switch 110. The output voltage is regulated to be D*Vin, where Vin is the supply voltage.

When the load current or the output voltage of the converter changes, the on-time remains fixed. This implies variation in the switching frequency of the converter.

Figure 4:
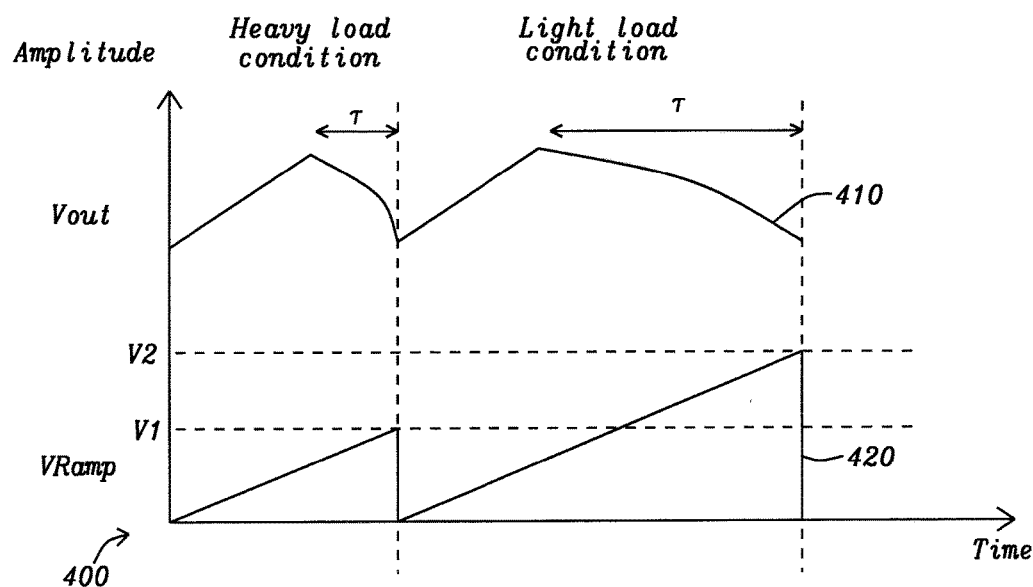
FIG. 4 is a timing chart illustrating the output voltage and the ramp voltage of the switching converter of FIGS. 1 and 2.

FIG. 4 shows the waveforms of the output voltage Vout 410 and the ramp voltage Vramp 420 of the converter of FIG. 1. In a switching converter, the output voltage Vout experiences amplitude variations between a minimum and a maximum voltage, sometimes referred to as ripples. The characteristic of these ripples may depend of a variety of parameters. In particular, a time duration it takes for Vout to decrease from its maximum to its minimum value, referred to as discharge time τ, varies as a function of the load applied to the output of the converter. When the converter is operating under heavy load conditions, Vout takes a relatively short time to return to its minimum value. In contrast, when the converter is operating under light load conditions, Vout takes a relatively long time to return to its minimum value. As a consequence, the switching period T of the converter increases. Depending on the load difference experienced by the converter, the switching period may increase by one or two orders of magnitudes. The ramp current Iramp follows a similar trend as the voltage ramp Vramp.

Figure 5:
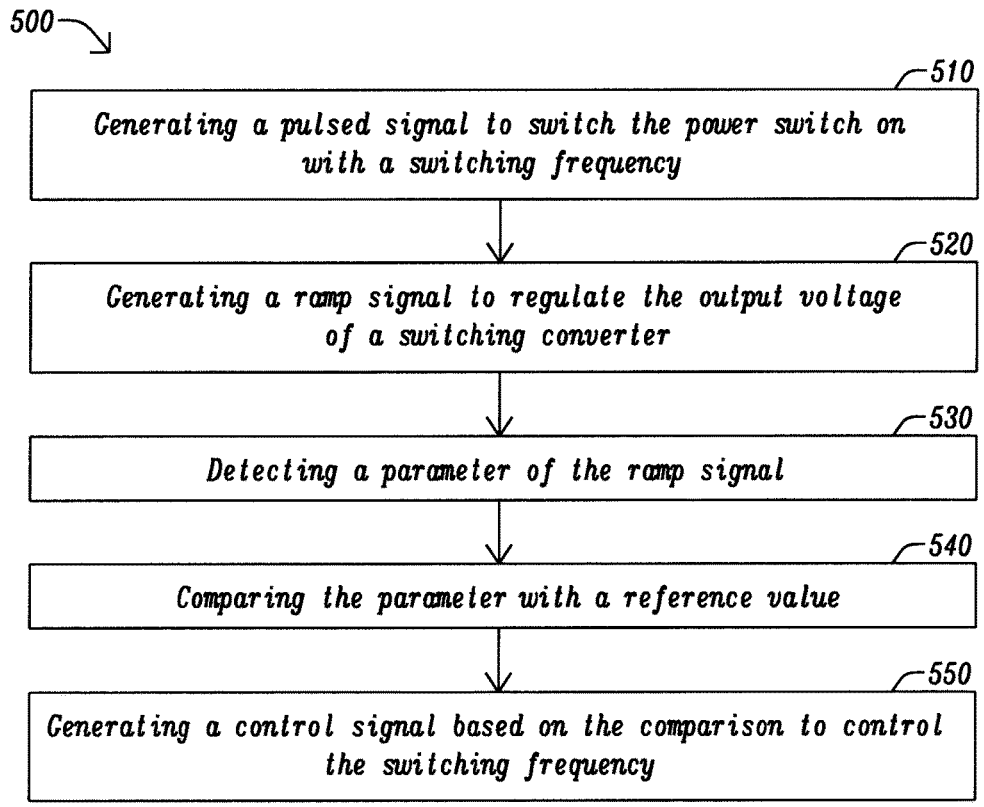
FIG. 5 is a flow diagram of a method of controlling a switching frequency of a switching converter.

FIG. 5 shows a flow diagram of a method of controlling a switching frequency of a switching converter comprising a power switch. At step 510, a pulsed signal is generated to switch the power switch with a given switching frequency. At step 520, a ramp signal to regulate the output voltage of the switching regulator is generated. At step 530, a parameter of the ramp signal is detected. For example, an amplitude, an on-width or a frequency of the ramp signal. At step 540, the parameter of the ramp signal is compared with a reference value. At step 550, a control signal based on the comparison is generated to regulate the switching frequency. For example, the control signal may be adapted to adjust a parameter of the pulsed signal, such as the on-time of the pulsed signal.

Figure 6:
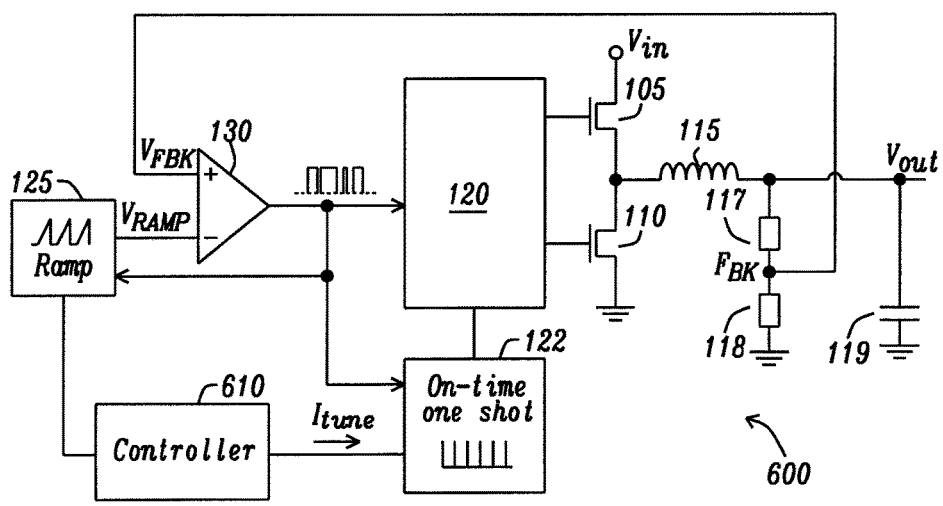
FIG. 6 is a diagram of an adaptive on-time switching converter.

FIG. 6 shows an adaptive on-time, AOT, converter 600 for implementing the method of FIG. 5. This circuit is similar to the circuit described with reference to FIG. 1, however in this case a controller 610 has been added and coupled between the ramp generator 125 and the pulse generator 122. The controller 610 has an input coupled to the output of the ramp generator 125 and an output coupled to the pulse generator 122. The controller 610 is adapted to detect a parameter of the ramp signal and to provide a control signal. For example, the ramp parameter may be an amplitude value of the ramp signal such as a voltage value. The ramp parameter may also be a time duration such as an on-width of the ramp signal corresponding to a time duration during which the ramp is turned on. Alternatively, the parameter of the ramp may be a frequency of the ramp signal. The control signal may be an electrical parameter value, for example a tuning current, Itune, for tuning an output of the pulse generator.

As mentioned above with reference to FIG. 2, the PWM comparator 130 may be adapted to compare Vfbk with a signal mixture. The signal mixture may comprise the ramp signal and another signal. For example, the other signal may include the voltage at the switching node, the inductor current, the output voltage of the converter or a filtered version of any one of these quantities. In this case the controller 610 is adapted to detect a parameter of the signal mixture comprising the ramp signal and another signal.

Figure 7:
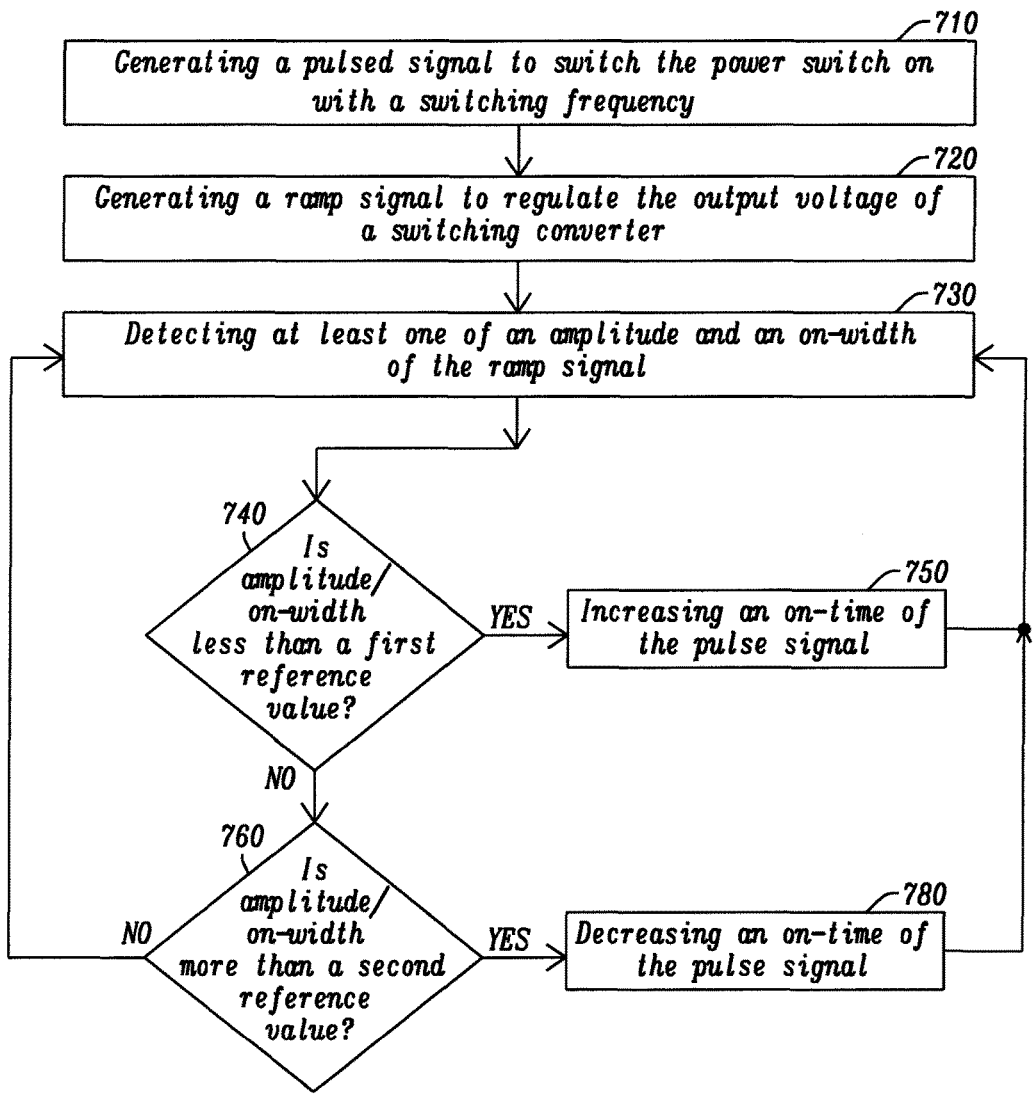
FIG. 7 is a flow diagram of a method of controlling a switching frequency of the switching converter of FIG. 6.

FIG. 7 shows a flow diagram of a method of controlling a switching frequency of a switching converter according to FIG. 6.

At step 710, the pulse generator 122 generates a pulsed signal to switch the power switch on with a given switching frequency. For example, the pulse generator 122 sends a series of pulses characterized by a given on-time and at a given frequency. At step 720, the ramp generator 125 generates a ramp signal to regulate the output voltage of the switching regulator. For example, the ramp generator 125 generates at least one of a ramp current Iramp and a ramp voltage Vramp. At step 730, the controller 610 detects parameter of the ramp signal such as an amplitude or an on-width of the ramp signal. At steps 740 and 760, the controller 610 compares the amplitude or the on-width of the ramp signal with a reference value. For example, if the ramp signal is a ramp voltage Vramp, then Vramp is compared with a reference voltage Vref, alternatively if the ramp signal is a ramp current Iramp, then Iramp may be compared with a reference current Iref. As demonstrated with reference to FIG. 4, when a load at the output of the switching converter is increasing, the switching frequency also increases. The ramp current $I_{Ramp}$ ramps up with time with a pre-determined slope in each cycle. From cycle to cycle, the waveform of $I_{Ramp}$ resembles a triangular wave with fixed height. If the switching frequency is increased, then the height of the $I_{Ramp}$ triangular wave will decrease.

If the amplitude or the on-width of the ramp signal is less than a first reference value, then the controller 610 generates at step 750 a control signal to increase the on-time of the pulse signal of the pulse generator. For example, the controller 610 generates a tuning current Itune to increase the on-time of the pulses generated by the pulse generator. As the on-time is increased, the switching frequency will decrease, which in turn brings the ramp amplitude back to its original value.

Conversely when the load decreases the switching frequency will also decrease and the amplitude and on-width of the ramp signal will increase. If the amplitude or the on-width of the ramp signal is more than a second reference value, then the controller 610 generates at step 780 a control signal to decrease the on-time of the pulse signal of the pulse generator. For example, the controller 610 generates a tuning current Itune to decrease the on-time of the pulses generated by the pulse generator. As the on-time is decreased, the switching frequency will increase, which in turn brings the ramp amplitude back to its original value.

The first and second reference value may be different values. This allows setting a range within which the change in frequency is acceptable. Alternatively, the first and second reference values may be identical. In this case any variation in amplitude or on-width of the ramp signal will be adjusted by the control signal.

FIG. 8 shows a theoretical waveform of a ramp signal and a corresponding on-time pulse train from the pulse generator during a load transient, using (a) a constant on-time converter and (b) an adaptive on-time converter as shown in FIG. 6.

Figure 8A:
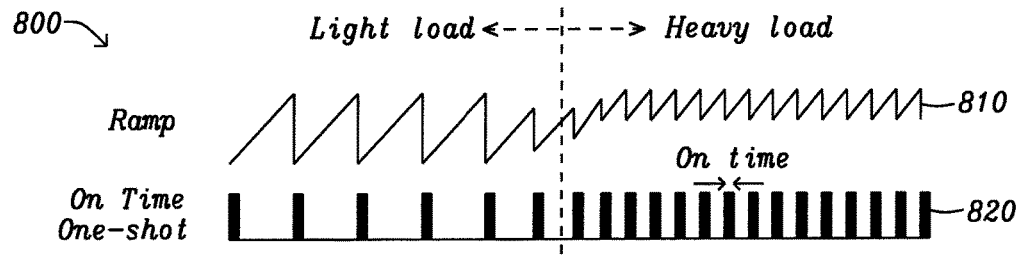
FIG. 8a is a theoretical waveform of a ramp signal and a corresponding on-time pulse train during a load transient, using the constant on-time converter of FIG. 1.

In FIG. 8(a), the on-time of the pulses 820 is fixed. As a result, when the load varies from a light load condition to a heavy load condition, the pulse frequency of the on-time pulse train 820 increases, corresponding to an increase in the switching frequency of the converter, and the amplitude of the ramp signal 810 decreases.

Figure 8B:
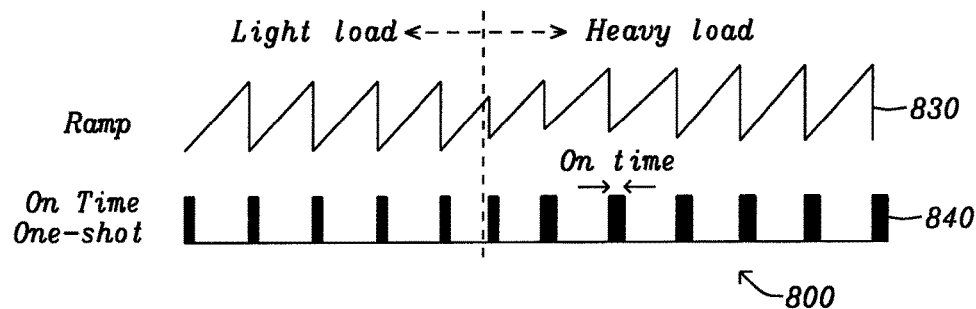
FIG. 8b is a theoretical waveform of a ramp signal and a corresponding on-time pulse train during a load transient, using the adaptive on-time converter of FIG. 6.

In FIG. 8(b), the on-time of the pulses 840 is allowed to vary. When the load increases, the on-time is initially fixed. As a result, the pulse frequency of the on-time pulse train 940 increases and the amplitude of the ramp signal 830 decreases. The decrease in amplitude or on-width of the ramp signal 830 is detected by the controller 610. The controller 610 then generates a control signal, for example a tuning current, to increase the on-time. The on-time keeps increasing until the switching frequency and the amplitude of the ramp signal 840 return to their original values. Therefore, after a short transition period, the amplitude of the ramp signal 830 and the frequency of the on-time pulse train 840, in the heavy load condition are substantially the same as the amplitude of the ramp signal 830 and the frequency of the on-time pulse train 840 in the light load condition.

Therefore, the adaptive on-time converter can be used to adjust dynamically the on-time of the pulses generated by the pulse generator, such that the switching frequency can be maintained substantially constant when a load condition is changing.

Figure 9:
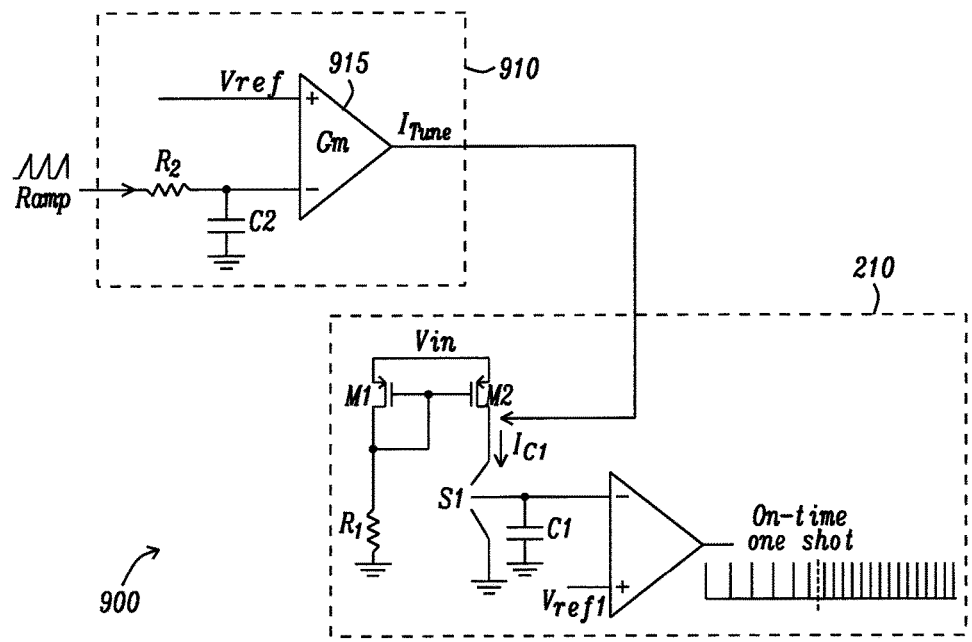
FIG. 9 is a controller circuit for controlling a pulse generator.

FIG. 9 shows an example of a controller 910 connected to a pulse generator 210 as described with reference to FIG. 2. The controller 910 is formed by an amplifier 915 that includes a non-inverting input connected to a reference voltage Vref and an inverting input connected to a low pass filter provided by a resistance R2 and a capacitor C2. An output of the amplifier 915 is coupled to the drain of the transistor M2 of the pulse generator 210. In an exemplary embodiment the amplifier 915 may be provided by an operational transconductor amplifier, such as a Gm cell. The low pass filter (R2, C2) is used for filtering out the high frequencies of the ramp signal. The amplifier 915 generates a tuneable current $I_{Tune}$ which may be positive or negative. The current $I_{Tune}$ is defined by (Vref−VC2)×gm, in which gm is the transconductance of the amplifier. The tuneable current is then injected into the pulse generator to change the time required for C1 to be charged from ground to Vref. This changes the on-time of the pulses generated by the pulse generator.

Figure 10:
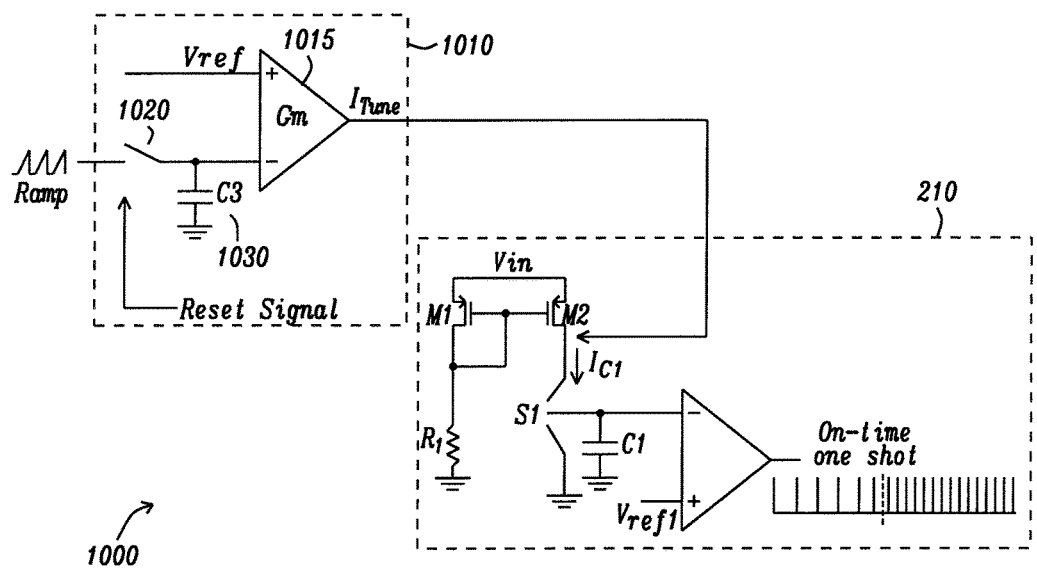
FIG. 10 is another controller circuit for controlling a pulse generator.

FIG. 10 shows another controller 1010. In this case the controller is provided by a sample and hold circuit formed by an amplifier 1015, a switch 1020, and a capacitor 1030 having a first and a second terminal. The amplifier 1015 has a first input for connecting to a reference voltage Vref and a second input for connecting to the first terminal of the capacitor 1030. The first terminal of the capacitor is connected to the switch 1020 and the second terminal of the capacitor is connected to a ground. An output of the amplifier 1015 is coupled to the drain of the transistor M2 of the pulse generator 210. The switch 1020 is adapted to receive a reset signal. For example, the reset signal can be the output of the PWM comparator 130 in FIG. 6. In operation, the switch 1020 is closed when the reset signal is turned on. In this way the sample and hold circuit extracts the amplitude of the ramp signal.

Figure 11:
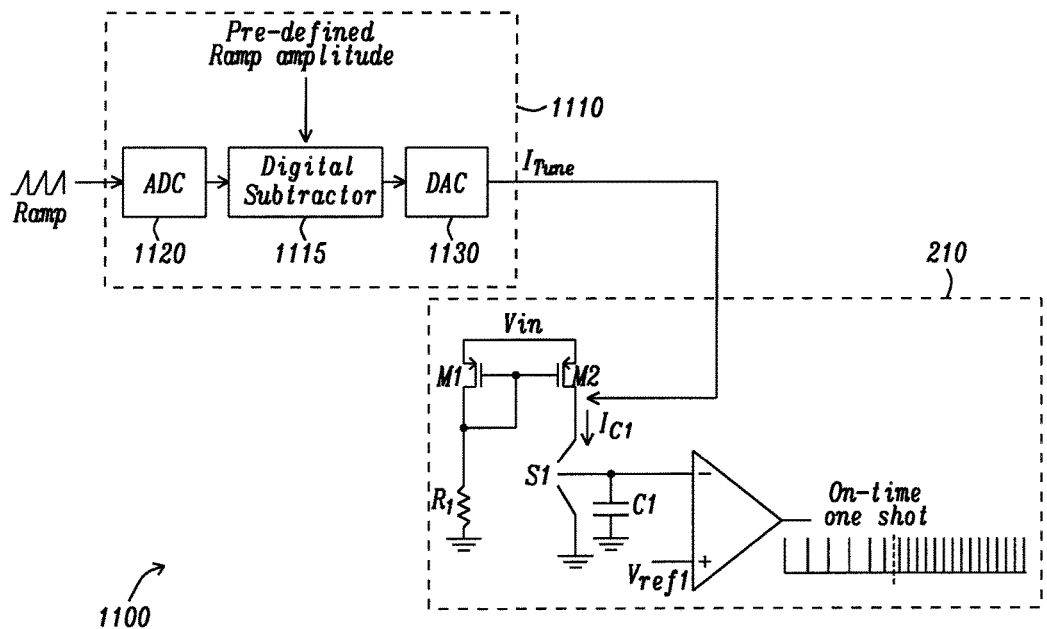
FIG. 11 is another controller circuit for controlling a pulse generator.

FIG. 11 shows another controller 1110. In this case the controller is provided by a digital subtractor 1115 coupled to an ADC 1120 at an input side and to a DAC 1130 at an output side. The digital subtractor 1115 has a first input adapted to receive a predefine ramp amplitude, a second input adapted to receive a digital signal from the ADC 1120, and an output coupled to the DAC 1130. The DAC 1130 has an output coupled to the drain of the transistor M2 of the pulse generator 210. In operation, the analog ramp signal is converted into a digital signal by the ADC 1120. The digital subtractor 1115 computes a difference between the ramp amplitude of the digitised ramp signal and a pre-defined ramp amplitude. The output of the digital subtractor 1115 is then sent to the DAC 1130 and converted into a control signal, in this example a current $I_{Tune}$.

As mentioned above, the on-time of the pulses generated by the pulse generator can also be adjusted based on the on-width of the ramp signal.

Figure 12:
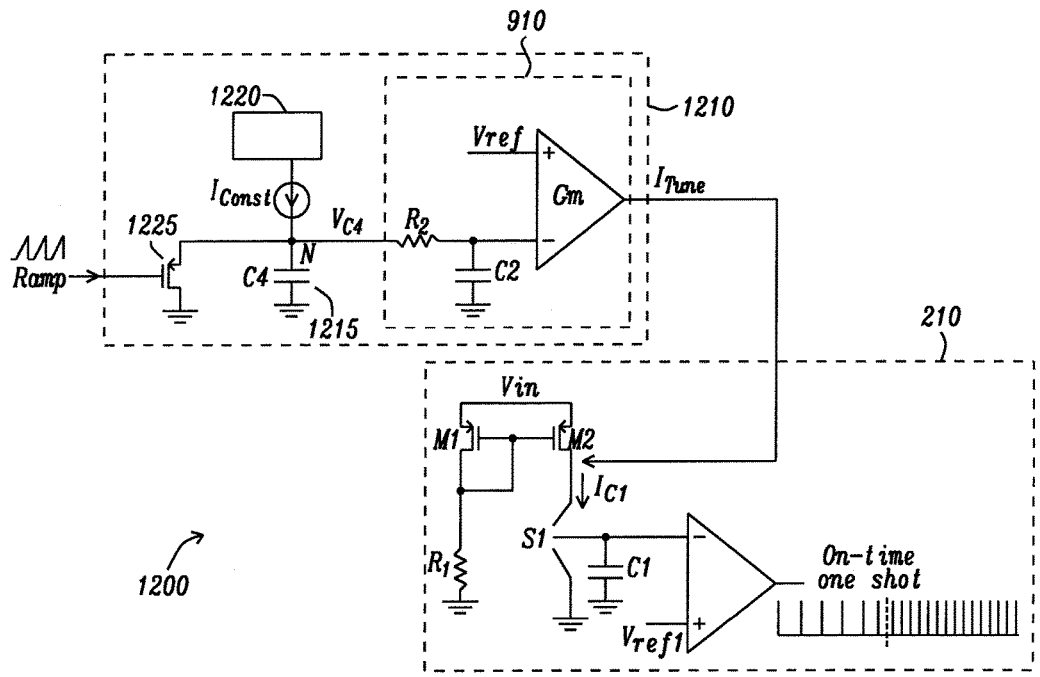
FIG. 12 is another controller circuit for controlling a pulse generator.

FIG. 12 shows an example of a controller 1210 adapted to detect an on-width of the ramp signal. The controller 1210 includes a capacitor C4 1215 connected at a first terminal to a ground and at a second terminal to a current generator 1220 for generating a constant current Iconst. A switch 1225 is connected in parallel with the capacitor 1215 for controlling a charge and a discharge of the capacitor. The switch 1225 may be a transistor having a gate controlled by the ramp signal. The switch 1225, the capacitor 1215 and the current generator 1220 are connected together at node N. An additional circuit is coupled between the node N and an input of the pulse generator 210. The additional circuit may be for example the circuit 910 of FIG. 9. In an alternative embodiment the additional circuit may be the circuit 1010 of FIG. 10, or the circuit 1110 of FIG. 11.

The control signal Itune is generated based on the on-width of the ramp signal. During a ramp on-width duration, the switch 1225 is turned off (open). During this time, a constant current Iconst charges the capacitor C4 1215 to a given voltage value. The voltage VC4 on capacitor C4 is then received at the input of the circuit 910. The circuit 910 provides a control signal Itune based on the voltage VC4. During a ramp delay time, the switch M1 turns on (closed). As a result, the capacitor C4 discharges and the voltage VC4 across the capacitor C4 reaches its minimum value. Once the ramp delay has expired, the switch M1 is turned off again and the constant current charges the capacitor C4.

Figure 13:
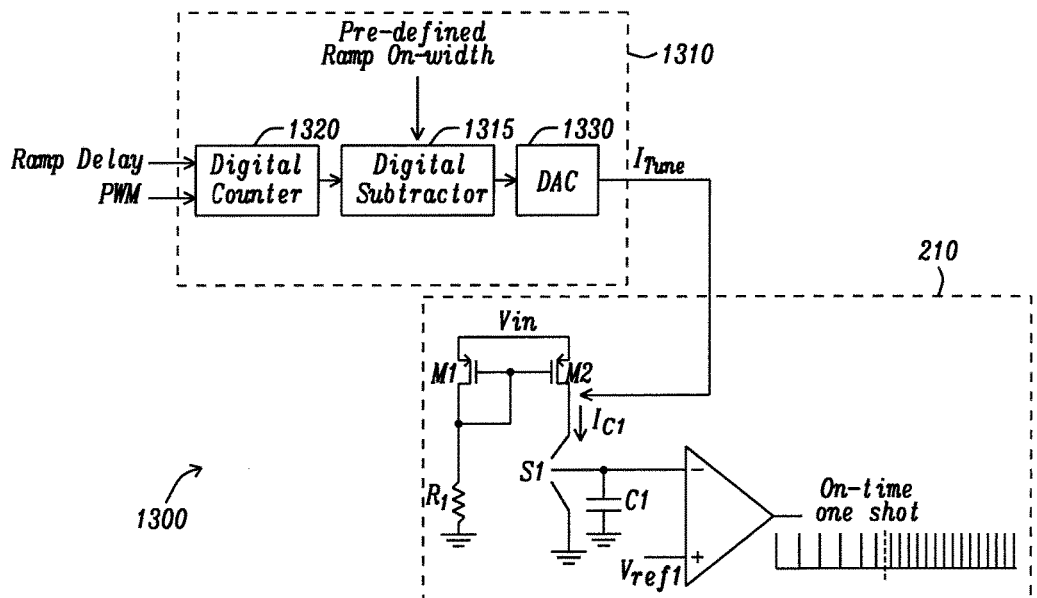
FIG. 13 is another controller circuit for controlling a pulse generator.

FIG. 13 shows another example of a controller adapted to detect an on-width of the ramp signal. The controller 1310 comprises a digital subtractor 1315, a digital counter 1320 and a digital to analog converter 1330, DAC. The digital subtractor 1315 has an input coupled to the digital counter 1320 and at an output coupled to the DAC 1330. An output of the DAC 1330 is coupled to the drain of the transistor M2 of the pulse generator 210. The digital counter 1320 has a first input for receiving the PWM signal generated by the comparator 130 of the switching converter, and a second input for receiving the ramp signal. Referring back to FIG. 6, a delay cell, not shown, may be provided between the output of the PWM comparator 130 and the switch S2 of the ramp generator, to introduce a delay in the ramp signal. For example, a delay of 100 ns can be introduced between two successive ramps.

In operation, when the ramp delay of the ramp signal expires, a logic signal is sent to the digital counter to start the digital counter. This counting process stops when the PWM signal is triggered low. The value counted by the digital counter corresponds to the on-width of the ramp. This counted value and a pre-defined on-width code, are sent to the digital subtractor 1315. The digital subtractor 1315 computes a difference between a counted ramp on-width and a pre-defined ramp on-width. For example, one may use a 4-bit register to save the pre-defined on-width code. Assuming the code to be defined as 4'b1000; if the counted on-width value is 4'b1010, then the subtracted value is 4'b0010. The output of the digital subtractor 1315 is then sent to the DAC 1330 and converted into a control signal, in this example a current $I_{Tune}$.

Adjusting the on-time based on the ramp on-width, adds no capacitive load to the ramp generator and therefore prevents potential distortion of the ramp signal. Referring back to FIG. 2, it can be observed that the ramp is generated by a current Iramp charging a network formed by Rref, R2 and C2. When using the controller circuits 910 or 1010 of FIGS. 9 and 10 respectively, the ramp signal is directly coupled to an additional capacitor which can distort the ramp signal. In contrast, when adjusting the on-time based on the ramp on-width, much smaller capacitive load is added to the ramp generator. As a result, the ramp signal is more stable.

Figure 14:
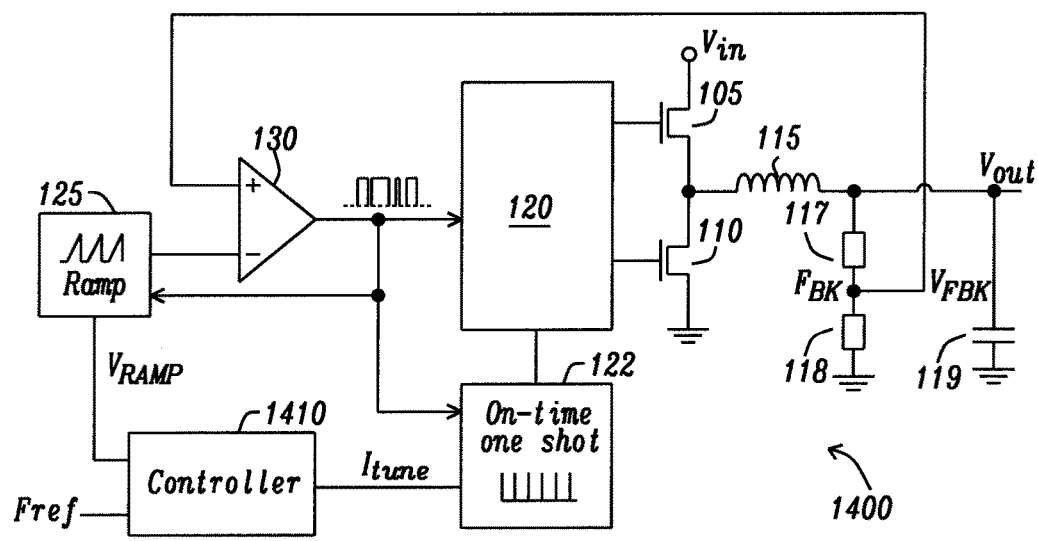
FIG. 14 is a diagram of another adaptive on-time switching converter.

FIG. 14, shows an alternative adaptive on-time AOT switching converter circuit. The circuit of FIG. 14 is similar to the circuit of FIG. 6. However, in this embodiment the controller 1410 includes a frequency comparator, such as for example a phase-frequency-detector, PFD. The controller 1410 has a first input for receiving an output of the ramp generator 125, for example the ramp voltage Vramp, a second input for receiving a reference clock, Fref, and an output for providing a control signal such as a current Itune.

In operation, the controller 1410 compares the frequency of the ramp signal provided by the ramp generator with a reference frequency. The controller 1410 then converts the frequency difference into a control signal, for example a tuning current Itune, to change the on-time. In this way the switching frequency of the converter can be maintained substantially equal to the reference frequency even when the load varies. In other word, the switching frequency of the converter is locked around the reference frequency.

Figure 15:
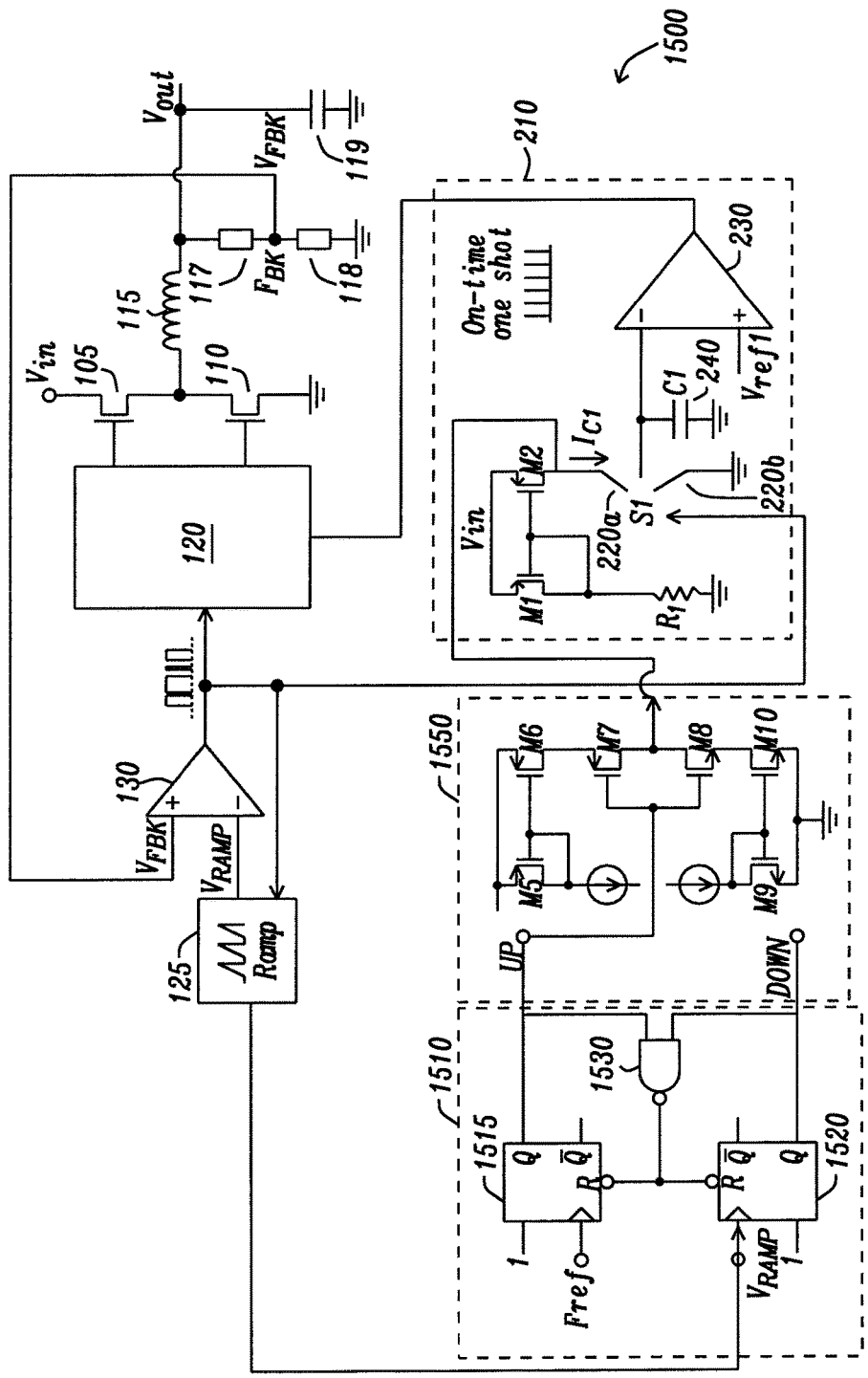
FIG. 15 is a diagram of an adaptive on-time switching converter provided with a phase frequency detector.

FIG. 15 shows an adaptive on-time AOT switching converter 1500 provided with a phase-frequency-detector, PFD 1510. The PFD 1510 includes a first flip flops 1515 coupled to a second flip flop 1520 via an AND gate 1530. The first flip flop 1515 has an input for receiving the reference clock Fref and an output connected to a first input of the AND gate 1530. The second flip flop 1520 has an input for receiving the Vramp signal and an output connected to a second input of the AND gate 1530. An output of the AND gate 1530 is connected to a reset of the first and second flip flop respectively. The PFD 1510 has an up output and a down output. The up output is coupled to a first and second input of a current circuit 1550. The current circuit 1550 has an output coupled to the drain of the transistor M2 of the pulse generator 210. The current circuit 1550 includes a first current generator connected to a first current mirror formed by transistors M5 and M6; and a second current generator connected to a second current mirror formed by transistors M9 and M10. The first and second current mirrors are coupled via a pair of transistors M7 and M8. Transistor M7 has a gate connected to the up output of the PFD. Transistor M8 has a gate connected to the up output of the PFD.

Depending on a difference in phase between the reference clock signal and the Vramp signal, the output of the PFD 1510 is either an up or a down pulse. When the up output is high, the transistor M7 is turned off (open) while the transistor M8 is turned on (closed). The circuit 1550 draws a current from IC1, hence reducing IC1. When the up output is low, the transistor M7 is turned on (closed) and the transistor M8 is turned off (open). The current circuit 1550 provides a positive current which increases IC1.

Figure 16:
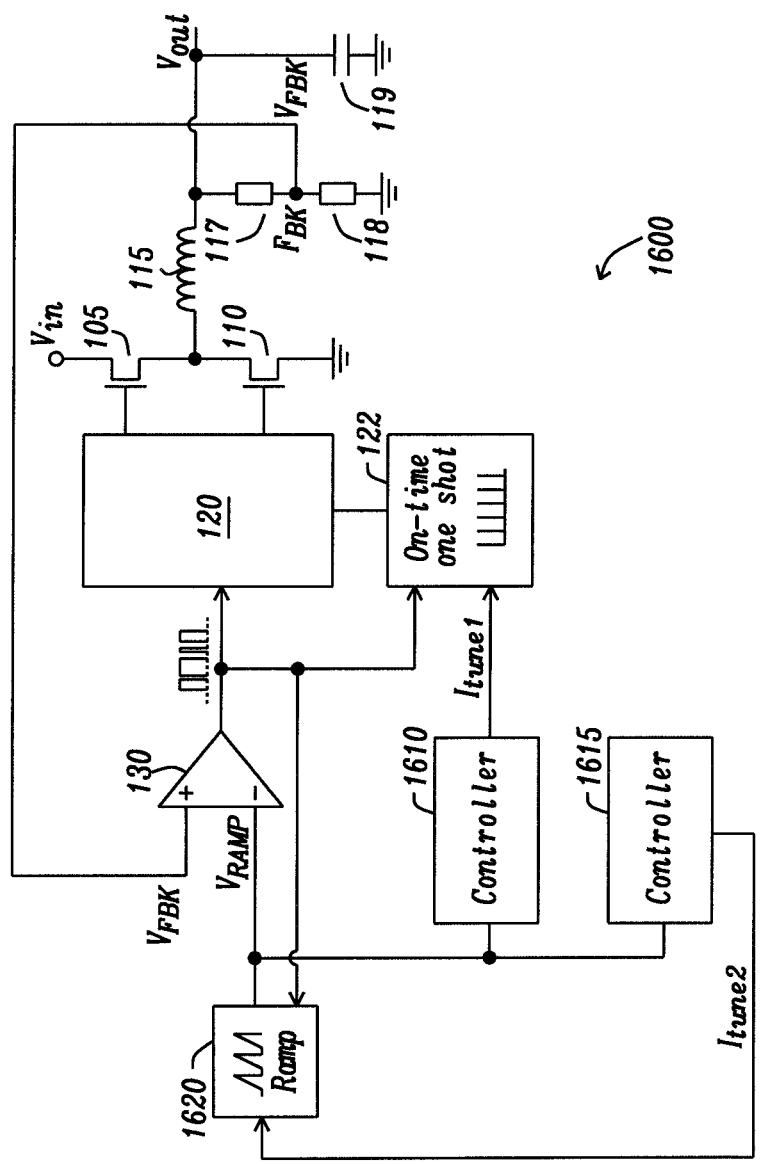
FIG. 16 is a diagram of yet another adaptive on-time switching converter.

FIG. 16 shows a diagram of another adaptive on-time switching converter. Compared with the circuit of FIG. 6, the AOT converter is now provided with a first controller 1610 for controlling the pulse generator 122 and a second controller 1615 for controlling the ramp generator 1620.

The output of the controller 1610 is coupled to the input of the pulse generator 122 and the output of the controller 1615 is coupled to an input of the ramp generator 1620. The ramp generator 1620 is adapted to adjust at least one of a delay and a slope of the ramp signal based on a feedback or control signal from the controller 1615. For example, the feedback or control signal may be a tuning current Itune2. The ramp generator 1620 may be implemented in different ways. For example, the ramp generator may be any one of the ramp generators described in application U.S. Ser. No. 15/195,991 incorporated herewith by reference.

Figure 17:
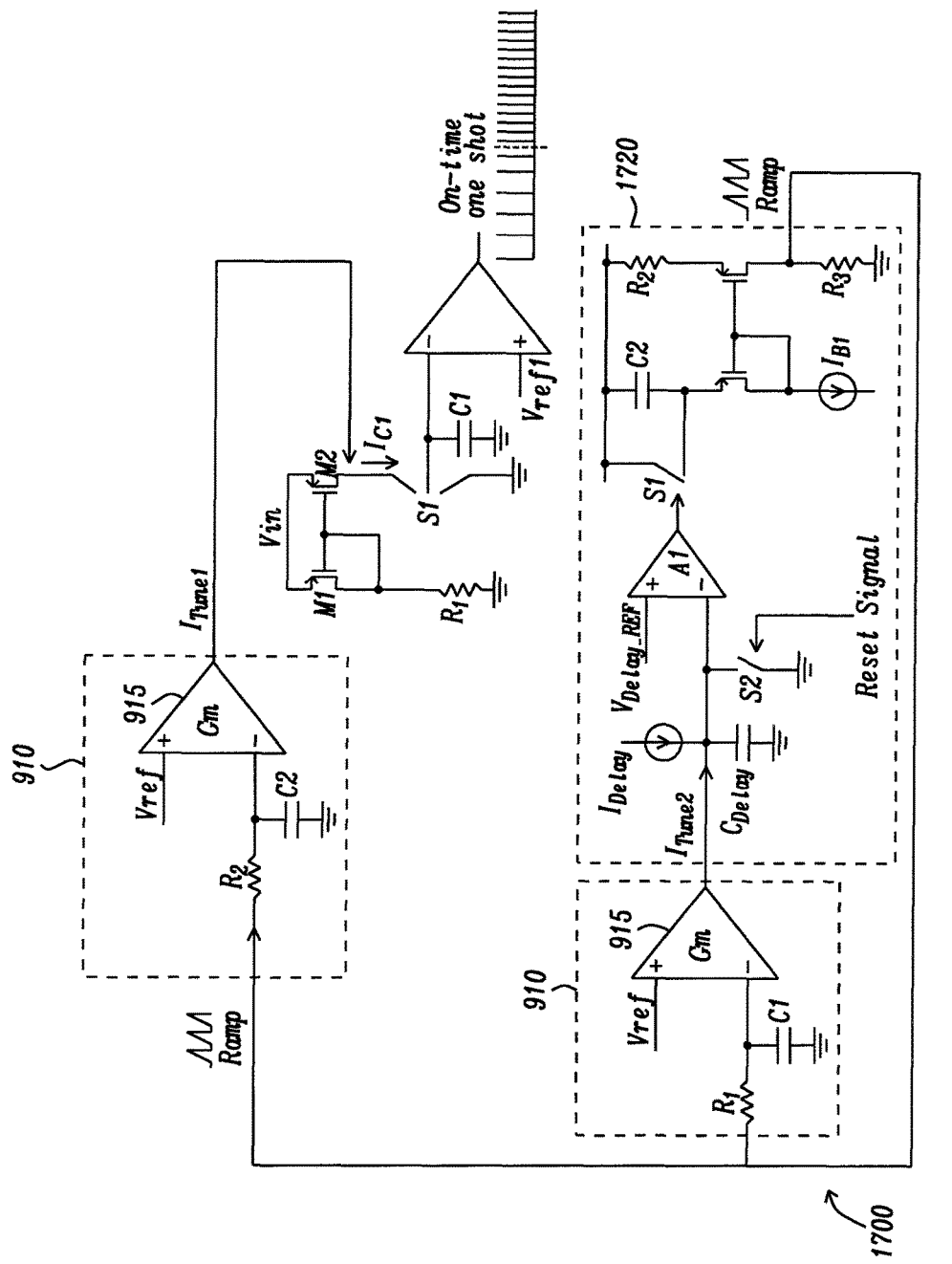
FIG. 17 is a diagram of a controller circuit for regulating both a pulse generator and a ramp generator.

FIG. 17 illustrates a possible embodiment of a control system of FIG. 16. In this example, both the first controller and the second controller are provided by a controller 910 as described in FIG. 9. However, the first and the second controllers do not need to be identical. For instance, any one of the controllers 1010, 1110, 1210, 1310 described in FIGS. 10 to 13 may be used.

The ramp generator 1720 has a delay cell for determining the ramp delay; a comparator 1725 having a first input, a second input and an output; and capacitor charging circuit having an input and an output. The delay cell comprises a current generator for generating delay current Idelay with a fixed value; and a capacitor Cdelay. A switch S2 is connected in parallel across Cdelay. The switch S2 is adapted to receive a reset signal to control the discharge of Cdelay. The first input of the comparator 1725 is connected to the output voltage of the delay cell, and the second input of the comparator 1725 is connected to a voltage reference Vdelayref. The output of the comparator 1725 is a logic signal for controlling operation of the capacitor circuit. The capacitor circuit includes a capacitor C2 coupled to a switch S1 and a voltage to current converter, such as a current mirror arrangement. The switch S1 is provided across the capacitor C2, and adapted to receive the logic signal from the comparator 1725. The current mirror arrangement may be provided by a first transistor connected to a second transistor. The first and second transistors are connected such that a gate of the first transistor is connected to a gate of the second transistor. A source of the first transistor is connected to a terminal of the capacitor C2 and a source of the second transistor is connected to a resistor R2. A drain of the second transistor is connected to a resistor R3. In this arrangement, the first and second transistors act as a voltage to current converter that converts the voltage across C2 into a current I. The ramp signal corresponds to a voltage (V=I×R3) across the resistor R3.

The AOT converter described according to FIGS. 16 and 17 allows to improve the operation of the converter under different operating conditions.

When operating under medium to heavy load conditions, the first controller 1610 is used to adjust the on-time to maintain a desired switching frequency. For example, the on-time may be adjusted in order to maintain the switching frequency of the converter at or near a constant value. Under heavy load condition the ramp delay may be reduced to zero.

When operating under light load conditions the second controller 1615 is used to adjust one of a delay and a slope of the ramp signal. This can help reduce output voltage variations of the converter under light load. In this case the on-time may be adjusted to a fixed minimum value, which may be zero. This fixed minimum value may be user defined. This can be achieved by setting the reference value of the second controller 1615. By decreasing the switching frequency under light load condition, it is possible to improve efficiency of the converter.

A skilled person will appreciate that variations of the disclosed arrangements are possible without departing from the disclosure. In particular the disclosure is not limited to buck converters. The teaching of the disclosure could also be applied to other types of converters such as buck boost converters. Accordingly, the above description of the specific embodiment is made by way of example only and not for the purposes of limitation. It will be clear to the skilled person that minor modifications may be made without significant changes to the operation described.

What is claimed is:

1. A switching converter for providing an output voltage comprising
    a power switch;
    a pulse generator adapted to generate a pulsed signal to switch the power switch on with a switching frequency;
    a ramp generator adapted to generate a ramp signal; and
    a controller having an input adapted to receive the ramp signal and an output connected to the pulse generator, the controller being adapted to detect a parameter of the ramp signal, compare the parameter with a reference value, and to generate a control signal based on the comparison;
    wherein the pulsed signal comprises an on-time and wherein the control signal is adapted to change the on-time of the pulsed signal depending on a load condition of the switching converter, such that in a heavy load condition the on-time is longer than in a light load condition, wherein the light load condition and the heavy load condition are separated by a transient condition;
    wherein the control signal changes the on-time of the pulsed signal to an adjusted value such that the switching frequency is substantially the same in the light load condition and in the heavy load condition.

2. The switching converter as claimed in claim 1, wherein the parameter of the ramp signal comprises at least one of an amplitude of the ramp signal and an on-width of the ramp signal.

3. The switching converter as claimed in claim 2, wherein the control signal is adapted to increase the on-time of the pulsed signal when at least one of the amplitude and the on-width of the ramp signal is less than a reference value.

4. The switching converter as claimed in claim 2, wherein the control signal is adapted to decrease the on-time of the pulsed signal when at least one of the amplitude and the on-width of the ramp signal is more than a reference value.

5. The switching converter as claimed in claim 1, wherein the parameter of the ramp signal comprises a frequency of the ramp signal.

6. The switching converter as claimed in claim 1, wherein the controller comprises a comparator adapted to compare the parameter of the ramp signal with a reference value and to output a signal based on the comparison.

7. The switching converter as claimed in claim 6, wherein the comparator comprises at least one of an operational amplifier and a digital subtractor coupled to a digital to analog converter.

8. The switching converter as claimed in claim 1, wherein the controller comprises a first circuit adapted to detect a time duration during which the ramp signal is turned on.

9. The switching converter as claimed in claim 8, wherein the first circuit comprises a current generator coupled to a capacitor and a switch connected in parallel with the capacitor; wherein the switch is adapted to receive a reset signal.

10. The switching converter as claimed in claim 8, wherein the first circuit comprises a counter.

11. The switching converter as claimed in claim 1, comprising another controller coupled to the ramp generator, the another controller being adapted to detect a parameter of the ramp signal, compare the parameter with a reference value, and to generate another control signal based on the comparison, wherein the ramp generator is adapted to receive the another control signal and to alter at least one of a delay and a slope of the ramp signal based on the another control signal.

12. The switching converter as claimed in claim 11, wherein the ramp generator comprises a capacitor circuit and a delay circuit coupled to a comparator; wherein the comparator is adapted to compare an output of the delay circuit with a reference value; and wherein the capacitor circuit is adapted to receive an output of the comparator.

13. A method of controlling a switching frequency of a switching converter comprising a power switch and a controller coupled to a ramp generator for generating a ramp signal and a pulse generator, the controller having an input adapted to receive the ramp signal and an output connected to the pulse generator, the method comprising
    generating a pulsed signal to switch the power switch on with a switching frequency;
    generating the ramp signal to regulate an output voltage of the switching converter;
    detecting a parameter of the ramp signal;
    comparing the parameter with a reference value; and
    generating a control signal based on the comparison;

wherein the pulsed signal comprises an on-time and wherein the control signal is adapted to change the on-time of the pulsed signal depending on a load condition of the switching converter, such that in a heavy load condition the on-time is longer than in a light load condition, wherein the light load condition and the heavy load condition are separated by a transient condition;

wherein the control signal changes the on-time of the pulsed signal to an adjusted value such that the switching frequency is substantially the same in the light load condition and in the heavy load condition.

14. The method as claimed in claim 13, wherein the parameter of the ramp signal is at least one of an amplitude of the ramp signal and an on-width of the ramp signal.

15. The method as claimed in claim 14, comprising increasing the on-time of the pulsed signal upon identifying that at least one of the amplitude and the on-width of the ramp signal is less than a reference value.

16. The method as claimed in claim 14, comprising decreasing the on-time of the pulsed signal upon identifying that at least one of the amplitude and the on-width of the ramp signal is more than a reference value.

17. The method as claimed in claim 13, wherein the parameter of the ramp signal is a frequency of the ramp signal.

18. The method as claimed in claim 13, comprising generating another control signal to control at least one of a delay and a slope of the ramp signal.

19. The method as claimed in claim 18, wherein generating the another control signal comprises detecting another parameter of the ramp signal, comparing the another parameter with another reference value, and generating the another control signal based on the comparison.

* * * * *

UNITED STATES PATENT AND TRADEMARK OFFICE
CERTIFICATE OF CORRECTION

PATENT NO.           : 10,333,403 B2
APPLICATION NO.      : 15/361981
DATED                : June 25, 2019
INVENTOR(S)          : Chi-Chia Huang and Yuan-Wen Hsiao Page 1 of 1

It is certified that error appears in the above-identified patent and that said Letters Patent is hereby corrected as shown below:

On the Title Page

Item (71), delete "Powerventure Semiconductor Limited, London (GB)" and replace with -- Dialog Semiconductor (UK) Limited, London, (GB) --.

Signed and Sealed this
Twenty-sixth Day of November, 2019

Andrei Iancu
*Director of the United States Patent and Trademark Office*